(12) United States Patent
Buendgen et al.

(10) Patent No.: US 11,809,607 B2
(45) Date of Patent: Nov. 7, 2023

(54) CUSTOMIZATION OF MULTI-PART METADATA OF A SECURE GUEST

(71) Applicant: INTERNATIONAL BUSINESS MACHINES CORPORATION, Armonk, NY (US)

(72) Inventors: Reinhard Theodor Buendgen, Baden-Wuerttemberg (DE); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 17/395,006

(22) Filed: Aug. 5, 2021

(65) Prior Publication Data

US 2023/0037746 A1 Feb. 9, 2023

(51) Int. Cl.
*G06F 21/64* (2013.01)
*G06F 9/455* (2018.01)
(Continued)

(52) U.S. Cl.
CPC .......... *G06F 21/64* (2013.01); *G06F 9/45545* (2013.01); *G06F 9/45558* (2013.01);
(Continued)

(58) Field of Classification Search
CPC .. G06F 21/64; G06F 9/45545; G06F 9/45558; G06F 21/44; G06F 21/53;
(Continued)

(56) References Cited

U.S. PATENT DOCUMENTS 10,303,899 B2 5/2019 Durham et al.
10,516,990 B2 12/2019 Wane
(Continued)

FOREIGN PATENT DOCUMENTS

CN 111095899 A 5/2020
TW 201740269 A 11/2017
(Continued)

OTHER PUBLICATIONS

Notification of Transmittal of the International Search Report and the Written Opinion of the International Searching Authority, PCT/EP2022/071772, dated Nov. 24, 2022, 12 pages.
(Continued)

*Primary Examiner* — Bruce S Ashley
(74) *Attorney, Agent, or Firm* — Edward J. Wixted, III; Blanche E. Schiller, Esq.; Heslin Rothenberg Farley & Mesiti P.C.

(57) ABSTRACT

A trusted execution environment obtains a secure guest image and metadata to be used to start a secure guest. The metadata includes multiple parts and a plurality of integrity measures. A first part of the metadata includes one or more integrity measures of the plurality of integrity measures, and a second part of the metadata includes customized confidential data of the secure guest and one or more other integrity measures of the plurality of integrity measures. The trusted execution environment is used to verify at least one select part of the metadata using at least one integrity measure of the plurality of integrity measures of the metadata. Based on successful verification of the at least one select part of the metadata, the trusted execution environment starts the secure guest using the secure guest image and at least a portion of the metadata.

25 Claims, 13 Drawing Sheets

(51) Int. Cl.
*G06F 21/44* (2013.01)
*G06F 21/53* (2013.01)
*G06F 21/60* (2013.01)
*G06F 21/71* (2013.01)

(52) U.S. Cl.
CPC .............. *G06F 21/44* (2013.01); *G06F 21/53* (2013.01); *G06F 21/602* (2013.01); *G06F 21/71* (2013.01); *G06F 2009/45587* (2013.01)

(58) Field of Classification Search
CPC ................... G06F 21/602; G06F 21/71; G06F 2009/45587; G06F 8/63; G06F 9/455; G06F 2009/45575; G06F 21/57; H04L 9/3234; H04L 9/3242; H04L 9/3247
See application file for complete search history.

(56) References Cited

U.S. PATENT DOCUMENTS

| | | | |
|---|---|---|---|
| 10,628,612 | B2 | 4/2020 | Durham et al. |
| 10,671,737 | B2 | 6/2020 | Durham et al. |
| 10,977,362 | B2 | 4/2021 | Yu et al. |
| 2002/0048369 | A1* | 4/2002 | Ginter .................. G06F 21/572 380/246 |
| 2005/0210467 | A1 | 9/2005 | Zimmer et al. |
| 2008/0244569 | A1 | 10/2008 | Challener et al. |
| 2009/0172328 | A1 | 7/2009 | Sahita et al. |
| 2013/0097296 | A1 | 4/2013 | Gehrmann et al. |
| 2017/0323098 | A1 | 11/2017 | Denier |
| 2017/0364685 | A1* | 12/2017 | Shah .................... G06F 21/575 |
| 2020/0285746 | A1 | 9/2020 | Buendgen et al. |
| 2020/0285748 | A1 | 9/2020 | Buendgen et al. |
| 2020/0326972 | A1 | 10/2020 | Doane et al. |
| 2021/0103629 | A1 | 4/2021 | Kiryu |
| 2022/0020000 | A1 | 1/2022 | Wilson |

FOREIGN PATENT DOCUMENTS

| | | | |
|---|---|---|---|
| TW | 202036345 | A | 10/2020 |
| TW | 202105226 | A | 2/2021 |
| WO | WO2019120328 | A2 | 6/2019 |

OTHER PUBLICATIONS

Notification of Transmittal of the International Search Report and the Written Opinion of the International Searching Authority, PCT/EP2022/071763, dated Nov. 21, 2022, 10 pages.
IBM, "z/Architecture—Principles of Operation," IBM Publication No. SA22-7832-12, Thirteenth Edition, Sep. 2019, pp. 1-2000.
Mell, Peter and Tim Grance, "The NIST Definition of Cloud Computing," National Institute of Standards and Technology, Information Technology Laboratory, Special Publication 800-145, Sep. 2011, pp. 1-7.
Citrix, "Security Recommendations When Deploying Citrix XenServer," 2016 (No Further Date Information Available), pp. 1-68.
Anonymous, "Protecting Secrets in Docker Environments," IP.com No. IPCOM000262988D, Jul. 20, 2020, pp. 1-5 (+ cover).
Anonymous, "Secure Computation Architecture for Client-Side Encryption," IP.com No. IPCOM000263004D, Jul. 21, 2020, pp. 1-5 (+ cover).
Anonymous, "Fully Decentralized Cloud Using Generalized Trusted Execution Environments and Distributed Hash Tables (Without Blockchain)," IP.com No. IPCOM000264923D, Feb. 5, 2021, pp. 1-6 (+ cover).
Hoffman, Owen S. et al., "InkTag: Secure Applications on an Untrusted Operating System," Mar. 2013, pp. 1-14.
Slay, Jill, "Enhancing Trust," 4th Australian Information Warfare & IT Security Conference, University of South Australia, Nov. 2003, pp. 1-426 (+ cover and Contents).
Bradbury, Jonathan D. et al., "Confidential Data Provided to a Secure Guest Via Metadata," U.S. Appl. No. 17/394,963, filed Aug. 5, 2021, pp. 1-39.
List of IBM Patents or Patent Applications Treated as Related, Aug. 10, 2021, 2 pages.

* cited by examiner

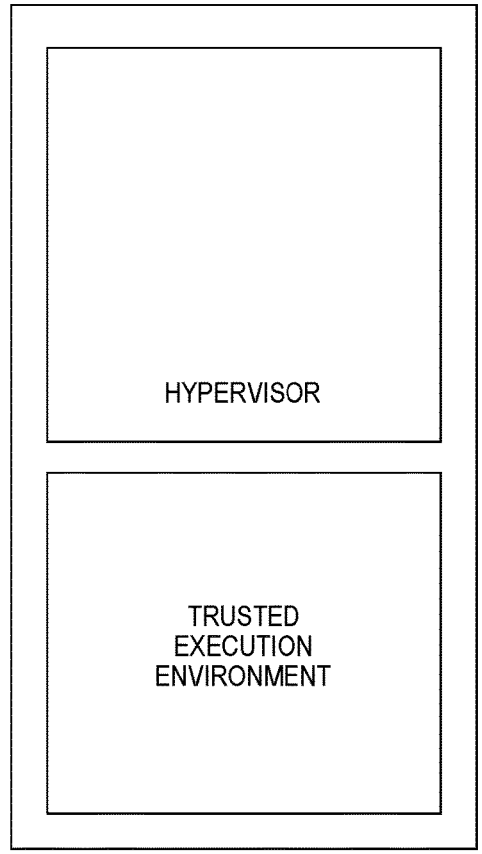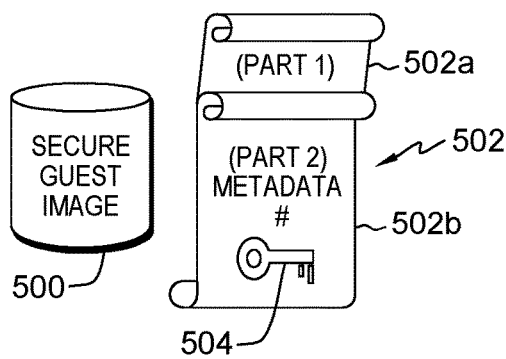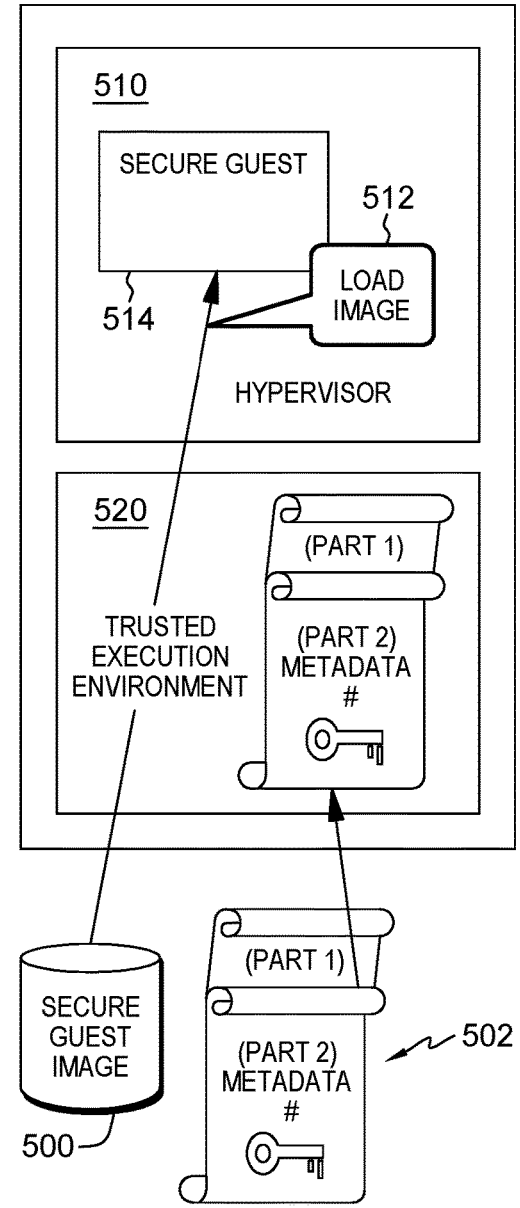
FIG. 5A  FIG. 5B

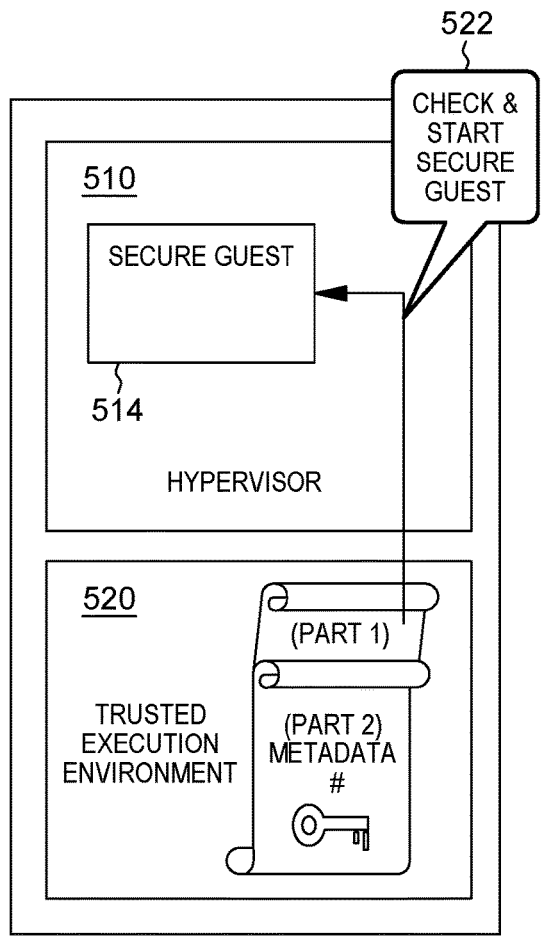
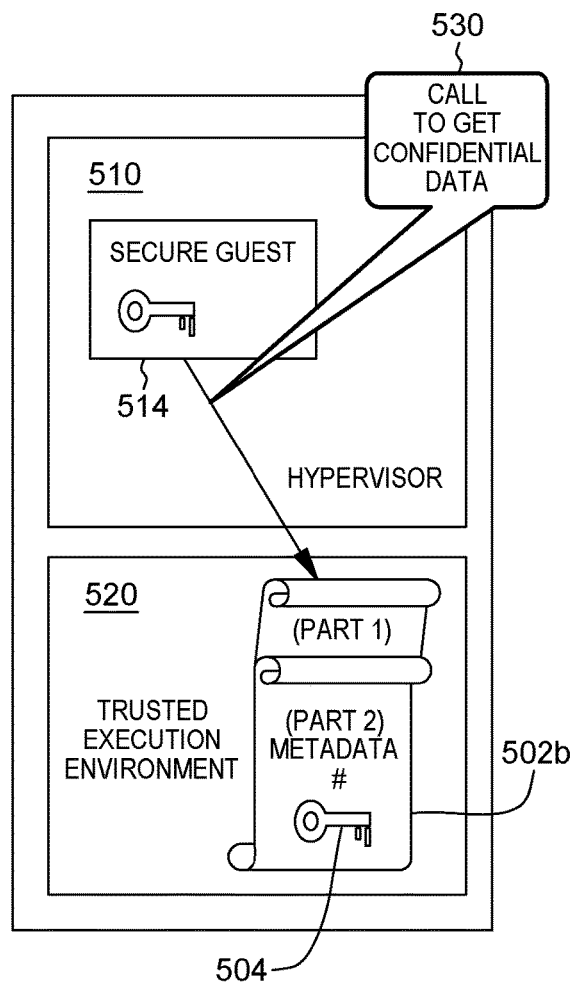
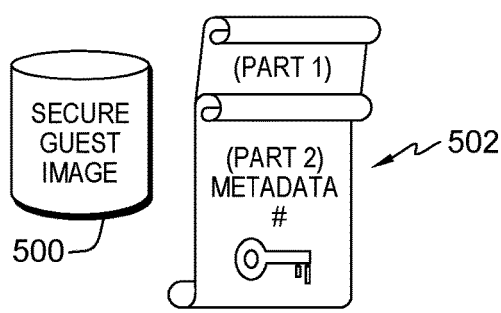
FIG. 5C
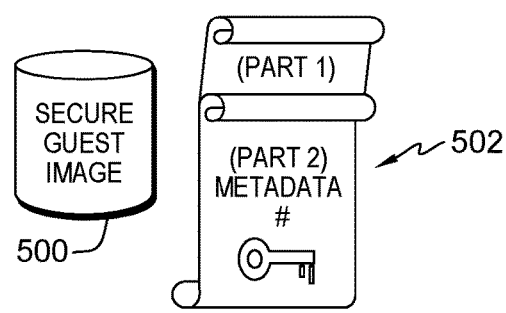
FIG. 5D

OBTAIN, BY A TRUSTED EXECUTION ENVIRONMENT, A SECURE GUEST IMAGE AND METADATA TO BE USED TO START A SECURE GUEST ~ 600

THE METADATA INCLUDES MULTIPLE PARTS AND A PLURALITY OF INTEGRITY MEASURES ~ 602

A FIRST PART OF THE METADATA INCLUDES ONE OR MORE INTEGRITY MEASURES OF THE PLURALITY OF INTEGRITY MEASURES ~ 604

A SECOND PART OF THE METADATA INCLUDES CUSTOMIZED CONFIDENTIAL DATA OF THE SECURE GUEST AND ONE OR MORE OTHER INTEGRITY MEASURES OF THE PLURALITY OF INTEGRITY MEASURES ~ 606

VERIFY, USING THE TRUSTED EXECUTION ENVIRONMENT, AT LEAST ONE SELECT PART OF THE METADATA USING AT LEAST ONE INTEGRITY MEASURE OF THE PLURALITY OF INTEGRITY MEASURES OF THE METADATA ~ 608

START, BY THE TRUSTED EXECUTION ENVIRONMENT, THE SECURE GUEST USING THE SECURE GUEST IMAGE AND AT LEAST A PORTION OF THE METADATA, BASED ON SUCCESSFUL VERIFICATION OF THE AT LEAST ONE SELECT PART OF THE METADATA ~ 610

---

THE FIRST PART OF THE METADATA IS INTEGRITY PROTECTED AND INCLUDES A FIRST ENCRYPTED PORTION AND THE SECOND PART OF THE METADATA IS INTEGRITY PROTECTED AND INCLUDES A SECOND ENCRYPTED PORTION ~ 612

THE TRUSTED EXECUTION ENVIRONMENT IS EXCLUSIVELY CONFIGURED TO DECRYPT THE FIRST ENCRYPTED PORTION AND THE SECOND ENCRYPTED PORTION ~ 614

AT LEAST ONE OF THE FIRST ENCRYPTED PORTION AND THE SECOND ENCRYPTED PORTION INCLUDES SELECT CONFIDENTIAL DATA TO BE USED IN PROCESSING RELATED TO THE SECURE GUEST ~ 616

FIG. 6A

THE VERIFYING THE AT LEAST ONE SELECT PART OF THE METADATA INCLUDES VERIFYING INTEGRITY OF THE FIRST PART OF THE METADATA ~620

THE VERIFYING INTEGRITY OF THE FIRST PART OF THE METADATA INCLUDES:

PERFORMING AT LEAST ONE INTEGRITY MEASUREMENT OF THE SECURE GUEST IMAGE LOADED INTO MEMORY OF THE SECURE GUEST TO OBTAIN A RESULT AND DETERMINING THAT THE RESULT HAS A PREDEFINED RELATIONSHIP WITH AT LEAST ONE INTEGRITY MEASURE OF THE ONE OR MORE INTEGRITY MEASURES OF THE FIRST PART OF THE METADATA ~622

VERIFYING INTEGRITY OF SELECT INFORMATION OF THE FIRST PART OF THE METADATA USING AT LEAST ONE INTEGRITY MEASURE OF THE ONE OR MORE INTEGRITY MEASURES OF THE FIRST PART OF THE METADATA ~624

THE VERIFYING THE AT LEAST ONE SELECT PART OF THE METADATA INCLUDES VERIFYING INTEGRITY OF THE SECOND PART OF THE METADATA USING AT LEAST ONE OTHER INTEGRETY MEASURE OF THE ONE OR MORE OTHER INTEGRITY MEASURES OF THE SECOND PART OF THE METADATA ~630

THE VERIFYING THE INTEGRITY OF THE SECOND PART OF THE METADATA INCLUDES PERFORMING AT LEAST ONE INTEGRITY MEASUREMENT OF THE FIRST PART OF THE METADATA TO OBTAIN A RESULT AND DETERMINING THAT THE RESULT HAS A PREDEFINED RELATIONSHIP WITH AT LEAST ONE OTHER INTEGRITY MEASURE OF THE ONE OR MORE OTHER INTEGRITY MEASURES OF THE SECOND PART OF THE METADATA ~632

ENABLE USE OF THE CUSTOMIZED CONFIDENTIAL DATA BASED AT LEAST ON VERIFYING THE INTEGRITY OF THE SECOND PART OF THE METADATA ~634

FIG. 6B

THE STARTING THE SECURE GUEST IS PERFORMED BASED ON A SUCCESSFUL VERIFICATION OF THE FIRST PART OF THE METADATA AND PRIOR TO VERIFICATION OF THE SECOND PART OF THE METADATA —640

THE STARTING THE SECURE GUEST IS PERFORMED BASED ON SUCCESSFUL VERIFICATION OF THE FIRST PART OF THE METADATA AND THE SECOND PART OF THE METADATA —642

THE METADATA INCLUDES ONE OR MORE PROCESSING RESTRICTIONS —644

PERFORM AT LEAST ONE CHECK OF AT LEAST ONE PROCESSING RESTRICTION OF THE ONE OR MORE PROCESSING RESTRICTIONS —646

THE STARTING THE SECURE GUEST IS PERFORMED BASED AT LEAST ON THE AT LEAST ONE CHECK BEING SUCCESSFUL —648

THE FIRST PART OF THE METADATA FURTHER INCLUDES CONFIDENTIAL DATA OF A CREATOR OF THE SECURE GUEST —650

PROVIDE FROM THE TRUSTED EXECUTION ENVIRONMENT TO THE SECURE GUEST THE CUSTOMIZED CONFIDENTIAL DATA STORED IN THE SECOND PART OF THE METADATA BASED ON A REQUEST FOR THE CUSTOMIZED CONFIDENTIAL DATA —652

FIG. 6C

CUSTOMIZATION OF MULTI-PART METADATA OF A SECURE GUEST

BACKGROUND

One or more aspects relate, in general, to facilitating processing within a computing environment, and in particular, to improving such processing.

A computing environment may support virtualization, in which a hypervisor or virtual machine manager of the computing environment hosts various guests, such as virtual machines or virtual servers of the computing environment. A virtual machine has access to system resources and may execute an operating system, such as a guest operating system. Different guests can be owned by different owners, and of these guests, some can be secure guests.

A traditional hypervisor has full control over the hosted guests. In particular, the hypervisor has the capability to inspect and even modify memory of the hosted guest. However, a secure guest is a guest that can be hosted by hypervisors that are not fully trustworthy. The image of such a secure guest would be protected when loaded and the protection of the contents of the resources assigned to the guest (e.g., memory, CPU registers) would be maintained throughout the lifetime of the guest. The protection of the guest includes at least integrity protection (e.g., hypervisor cannot maliciously change any guest states) and in addition can include maintaining the confidentiality of the initial image, code and data running in the secure guest.

Secure guests may wish to have access to confidential data of the secure guests. Processing used to provide such confidential data to the secure guests is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining, by a trusted execution environment, a secure guest image and metadata to be used to start a secure guest. The metadata includes multiple parts and a plurality of integrity measures. A first part of the metadata includes one or more integrity measures of the plurality of integrity measures, and a second part of the metadata includes customized confidential data of the secure guest and one or more other integrity measures of the plurality of integrity measures. The trusted execution environment is used to verify at least one select part of the metadata using at least one integrity measure of the plurality of integrity measures of the metadata. Based on successful verification of the at least one select part of the metadata, the trusted execution environment starts the secure guest using the secure guest image and at least a portion of the metadata.

The providing of multiple parts of the metadata enables, for instance, vendor-specific and customer-specific confidential data to be maintained separately. It also facilitates processing by enabling each part separately and independently to be used in starting a secure guest and/or enabling access to confidential data.

As an example, the first part of the metadata is integrity protected and includes a first encrypted portion and the second part of the metadata is integrity protected and includes a second encrypted portion. The trusted execution environment is exclusively configured to decrypt the first encrypted portion and the second encrypted portion. At least one of the first encrypted portion and the second encrypted portion includes select confidential data to be used in processing related to the secure guest. By exclusively configuring the trusted execution environment to decrypt the encrypted portions, confidentiality is secured. The encrypted portions may include confidential data useful in, for instance, decrypting an encrypted image, in communication with the owner of the guest, and/or to be used during execution of the secure guest.

In one example, the verifying the at least one select part of the metadata includes verifying integrity of the first part of the metadata. The verifying integrity of the first part of the metadata includes, for instance, performing at least one integrity measurement of the secure guest image loaded into memory of the secure guest to obtain a result and determining that the result has a predefined relationship with at least one integrity measure of the one or more integrity measures of the first part of the metadata. The verifying integrity of the first part also includes, for instance, verifying integrity of select information of the first part of the metadata using at least one integrity measure of the one or more integrity measures of the first part of the metadata. By verifying integrity of the first part of the metadata, the secure guest is not improperly started, maintaining protection.

In one example, the verifying the at least one select part of the metadata includes verifying integrity of the second part of the metadata using at least one other integrity measure of the one or more other integrity measures of the second part of the metadata. The verifying the integrity of the second part of the metadata includes, for instance, performing at least one integrity measurement of the first part of the metadata to obtain a result and determining that the result has a predefined relationship with at least one other integrity measure of the one or more other integrity measures of the second part of the metadata. By having the second part of the metadata contain measurements of the first part of the metadata, the creator of the second part of the metadata is able to restrict that part of the metadata to be combined only with a very specific first part of the metadata. This facilitates the maintaining of confidentiality and security.

In one embodiment, use of the customized confidential data is enabled based at least on verifying the integrity of the second part of the metadata.

As an example, the starting the secure guest is performed based on successful verification of the first part of the metadata and prior to verification of the second part of the metadata. This allows the starting of the secure guest to be performed prior to verification of the second part of the metadata. As another example, the starting the secure guest is performed based on successful verification of the first part of the metadata and the second part of the metadata.

In one example, the metadata includes one or more processing restrictions. At least one check of at least one processing restriction of the one or more processing restrictions is performed. Based at least on the at least one check being successful, the starting the secure guest is performed. Since each metadata part is separate, checks from the first part may be performed and then the secure guest may be started. Thereafter, checks from the second part may be performed. In another embodiment, the checks from both parts are performed prior to, for instance, starting the secure guest.

As an example, the first part of the metadata further includes confidential data of a creator of the secure guest.

Further, in one aspect, based on a request for the customized confidential data, the customized confidential data stored in the second part of the metadata is provided from the trusted execution environment to the secure guest.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5D depict one example of a process to insert confidential data in a secure guest, in accordance with one or more aspects of the present invention;

FIGS. 6A-6C depict one example of facilitating processing within a computing environment, in accordance with one or more aspects of the present invention;

DETAILED DESCRIPTION

In accordance with one or more aspects of the present invention, a capability is provided to facilitate processing within a computing environment. As an example, the capability includes providing confidential data (a.k.a., a secret) to a secure guest of the computing environment. As an example, the confidential data is included in metadata of the secure guest, and the metadata is loaded into a trusted execution environment. For instance, the metadata includes multiple (e.g., two) parts. One part includes at least a generic guest image provided by a vendor that may be used to start one or more secure guests and optionally, vendor-specific confidential data, and another part includes information that is specific for the secure guest. For instance, the other part is customized with customer-specific confidential data. This customization is provided, for instance, without the customer being required/able to learn vendor-specific confidential data and without the vendor being required/able to learn customer-specific confidential data. The second part (i.e., other part) relates to the one part but is, in one embodiment, independently and separately provided to the secure guest.

Each of the two parts of the metadata also includes integrity measures used to verify one or more parts of the multi-part metadata. At least a portion of the metadata is verified or accepted prior to starting a secure guest.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Figure 1:
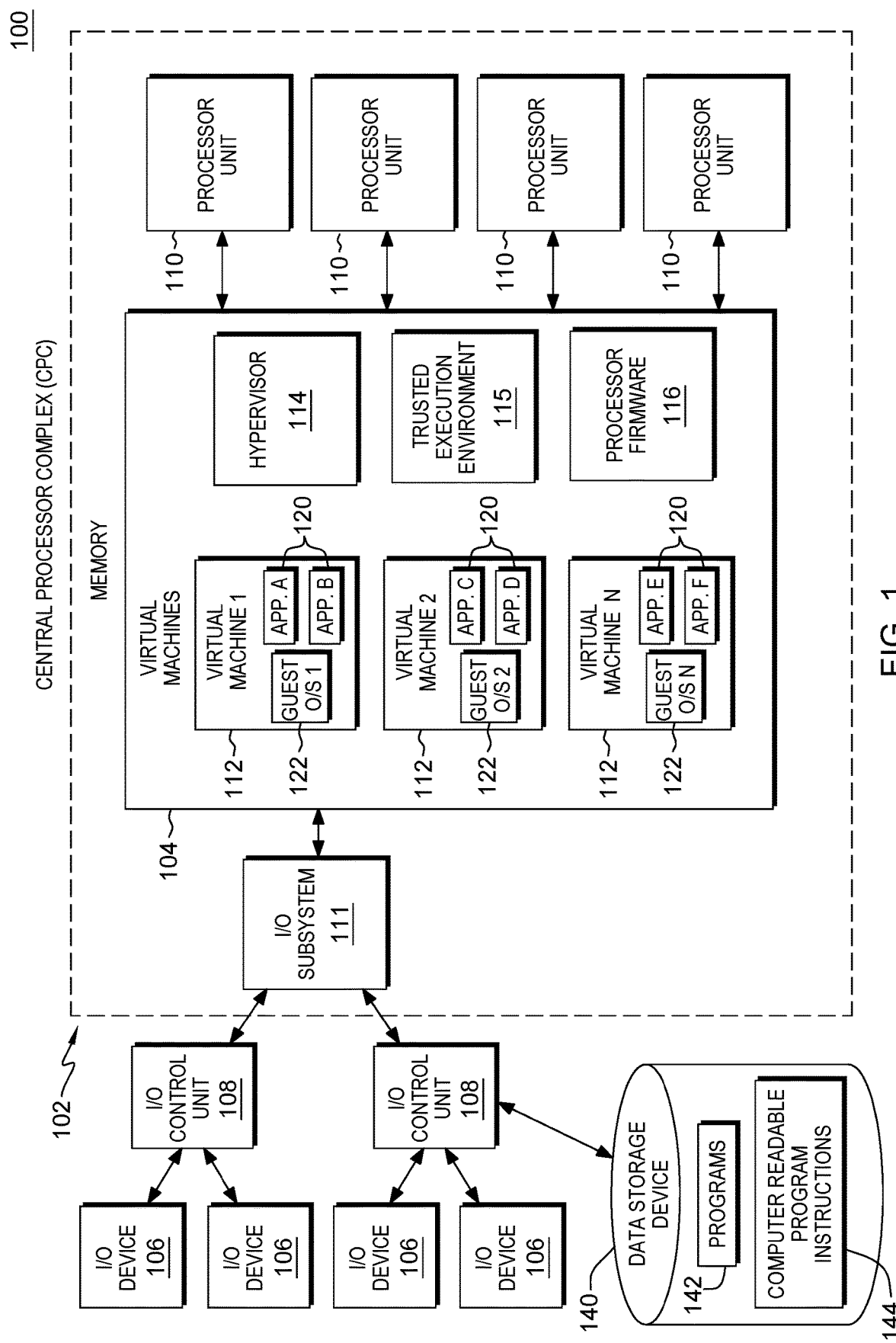
FIG. 1 depicts one example of a computing environment to incorporate and use one or more aspects of the present invention.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 (also referred to as an ultravisor) and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 2:
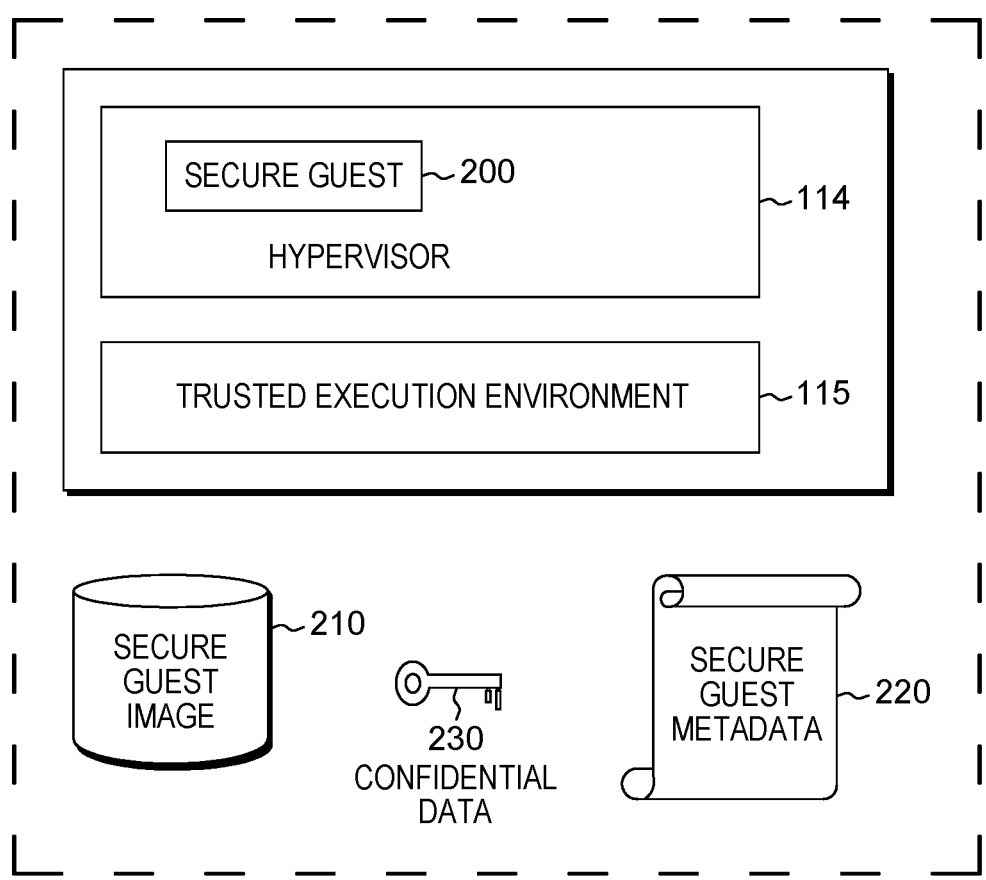
FIG. 2 depicts one example of confidential data to be included in a secure guest, in accordance with one or more aspects of the present invention.

In one embodiment, one or more guests 112 are secure guests. Referring to FIG. 2, a secure guest 200 is started by a hypervisor (e.g., hypervisor 114) in a manner that the hypervisor cannot observe the state (e.g., memory, registers, etc.) of the secure guest. For instance, in one embodiment of confidential computing, the hypervisor can start/stop a secure guest, and the hypervisor knows where data used to start the secure guest is located but it cannot look into the running secure guest. Data used to load/start the secure guest may be encrypted in a manner that the hypervisor cannot see the secure guest. The owner of the secure guest image places confidential data in the secure guest metadata and then generates a secure guest image together with the secure guest metadata. After the secure guest is loaded, any interaction with the state of the secure guest is processed by a trusted execution environment, such as trusted execution environment 115.

In one embodiment, to start a secure guest, the hypervisor passes a secure guest image 210 that the hypervisor previously loaded into memory and secure guest metadata 220 to trusted execution environment 115. The metadata is integrity and at least partially confidentially protected and, in one embodiment, is only interpreted by the trusted execution environment. Based on the information in the secure guest metadata, the trusted execution environment can then enforce the integrity of the secure guest image loaded into memory of, e.g., the hypervisor, protect the memory of the secure guest containing the loaded image from being accessible by the hypervisor, and potentially decrypt the secure guest image before starting the secure guest.

In accordance with one or more aspects of the present invention, a confidentially protected part of the metadata of the secure guest is customized to the secure guest in which customer-specific confidential data 230 is added to the metadata. As an example, this confidential data is added to the metadata absent the customer being required/able to learn any vendor-specific confidential data and absent the vendor being required/able to learn customer-specific confidential data. In one embodiment, the metadata is partitioned into multiple parts. As a particular example, the metadata is partitioned into two parts; however, in other embodiments, the metadata may be partitioned into more than two parts. The two parts are referred to herein as one part or a first part and another part or a second part. The use of first and second does not indicate any type of ordering; they are used simply for convenience. Further details of partitioned metadata are described with reference to FIG. 3.

Figure 3:
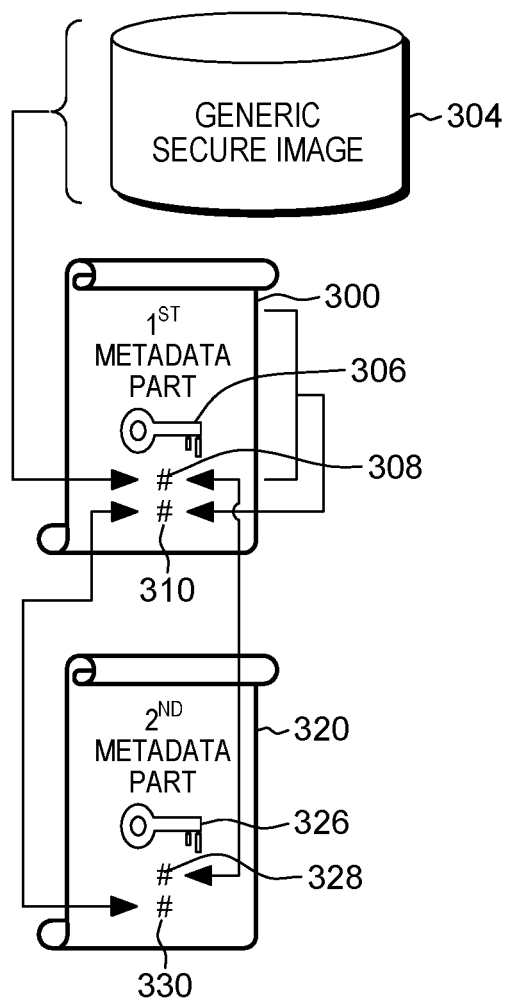
FIG. 3 depicts one example of multi-part metadata used in accordance with one or more aspects of the present invention.

In one example, referring to FIG. 3, the metadata (e.g., metadata 220) is partitioned into two parts including: one part or first part 300 and another part or second part 320. In one example, first part 300 is cryptographically bound to a generic secure guest image 304 using integrity measures 308 and includes, e.g., vendor-specific confidential data 306, one or more processing restrictions 310 and a measure 312 of itself. Further, in one example, second part 320 includes, for instance, customer-specific confidential data 326 (e.g., confidential data 230), integrity measures 328 of the generic secure guest image, processing restrictions 330 and a measure 332 of itself, as further described below. Each part is independently integrity protected and each part is related, but independent of, one another. One part may be provided to a guest separate from and at a different time than another part. Further, each part may include additional, fewer and/or other data in other embodiments.

As one example, the first part of the metadata (e.g., first part 300) includes, for instance, information that allows only valid trusted execution environments to interpret first part 300 of the metadata (e.g., the information to obtain the key(s) to verify integrity of the metadata and to decrypt the encrypted data in first part 300 of the metadata); one or more integrity measures (e.g., hash, message authentication code, cryptographic signature, etc.) of the secure guest image to be started; one or more key(s) to decrypt the encrypted part of the secure guest image; one or more optional flags to control usage environments and processing restrictions; optional confidential data of the creator of the secure guest image; and one or more integrity measures (e.g., hash, message authentication code, cryptographic signature, etc.) of other information of first part 300.

Further, in one example, second part 320 of the metadata includes, for instance, information that allows only valid trusted execution environments to interpret second part 320 of the metadata (e.g., the information to obtain the key(s) to verify integrity of the metadata and to decrypt the encrypted data in the other part of the metadata); optionally, one or more integrity measures (e.g., hash, message authentication code, cryptographic signature, etc.) of the secure guest image to be started; a copy of one or more integrity measures of first part 300 of the metadata and/or one or more integrity measures of the first part independently measured rather than copied; optionally, one or more flags to control usage environments and processing restrictions; confidential data of the secure guest image user (i.e., customer-specific confidential data); and one or more integrity measures (e.g., hash, message authentication code, cryptographic signature, etc.) of other information of second part 320.

Although example information is provided for both the first part and the second part of the metadata, additional, less and/or other information may be provided for the first part, the second part or both parts.

In accordance with one or more aspects of the present invention, one or more parts of the multiple parts of the metadata are used to start a secure guest, as described with reference to FIGS. 4A-4B.

Figure 4A:
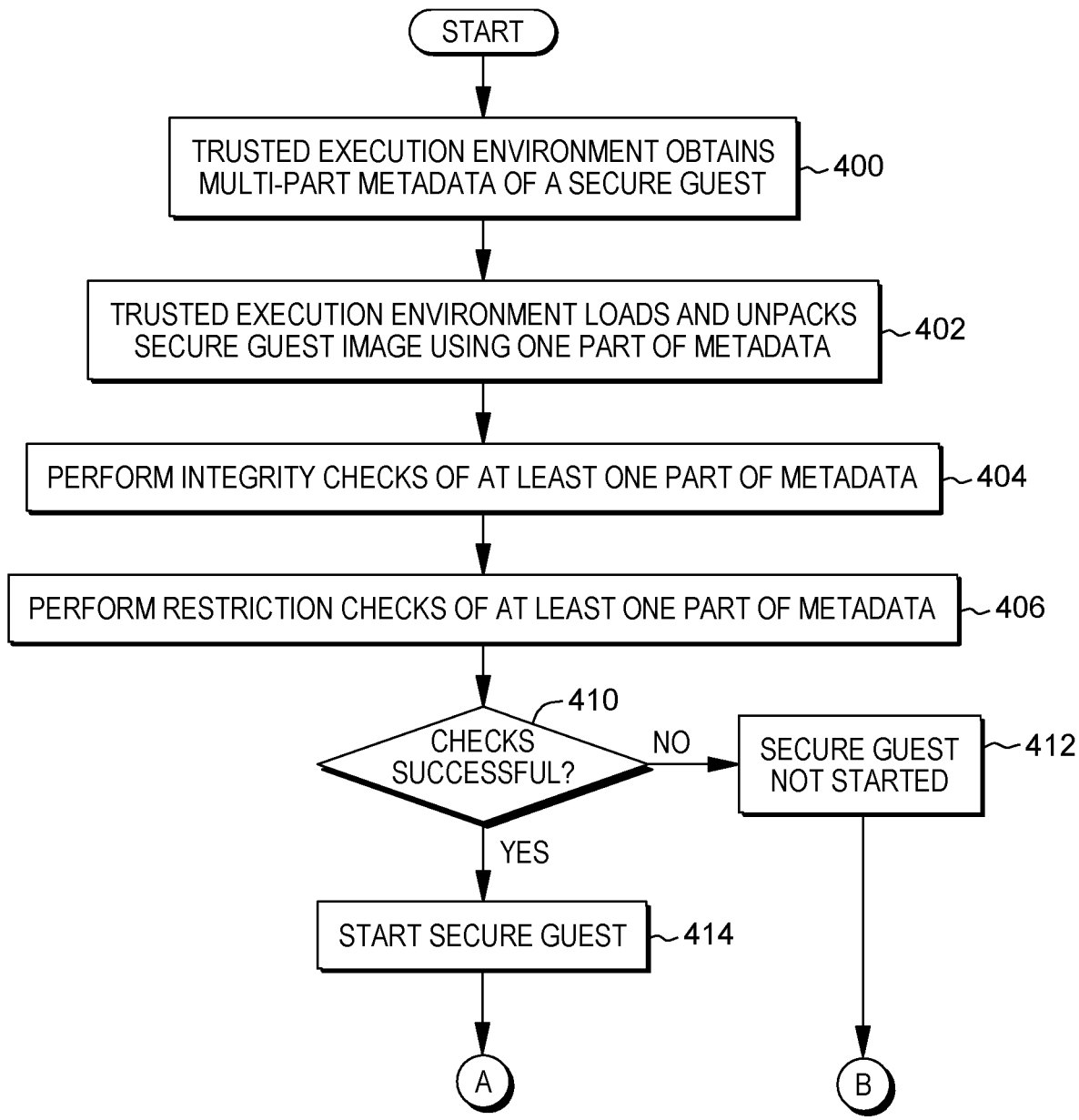
FIGS. 4A-4B depict one example of starting a secure guest using multi-part metadata, in accordance with an aspect of the present invention.

Referring initially to FIG. 4A, in one embodiment, a trusted execution environment (e.g., trusted execution environment 115) obtains multi-part metadata of a secure guest 400. The trusted execution environment receives and optionally unpacks (e.g., decrypts) a secure guest image using at least one part of the metadata (e.g., first part 300) 402. The trusted execution environment performs one or more integrity checks of at least one part of the metadata 404. For instance, the trusted execution environment verifies the integrity of the first part of the metadata and the second part of the metadata. In one embodiment, the verification of the integrity of the first part of the metadata is performed prior to starting the secure guest, and the verification of the integrity of the second part of the metadata may be performed prior to starting the secure guest or subsequent to starting the secure guest, as described herein.

In one example, to verify the integrity of the first part of the metadata, at least one integrity measurement of the secure guest image loaded into memory of the secure guest is performed (e.g., computation of a hash, a message authentication code or signature verification, etc., using one or more techniques now known or later developed) to obtain a result (e.g., a hash, a message authentication code, a cryptographic signature, etc.) and a determination is made as to whether the result has a predefined relationship (e.g., equal) with at least one integrity measure of the one or more integrity measures included in the first part of the metadata. If, for instance, the result is equal to a corresponding integrity measure in the first part of the metadata, then the verification is successful. Further, in one example, integrity of select information of the first part of the metadata is verified by using one or more integrity measures of the first part of the metadata. For instance, one or more integrity measures associated with the select information are compared to one or more corresponding integrity measures in the first part and if they have a predefined relationship (e.g., equal), then integrity of the select information is verified.

To verify the integrity of the second part of the metadata, in one embodiment, at least one integrity measurement of the first part of the metadata is performed to obtain a result, (e.g., a hash, a message authentication code, a cryptographic signature, etc.) and a determination is made as to whether the result has a predefined relationship (e.g., equal) with at least one integrity measure of the one or more other integrity measures included in the second part of the metadata. If, for instance, the result is equal to a corresponding integrity measure in the second part of the metadata, then the verification is successful. Further, in one example, integrity of select information of the second part of the metadata is verified by using one or more integrity measures of the second part of the metadata. For instance, one or more integrity measures associated with the select information are compared to one or more corresponding integrity measures in the second part and if they have a predefined relationship (e.g., equal), then integrity of the select information is verified.

Although examples of verifications are described herein, additional, fewer and/or other verifications may be performed to verify the integrity of the first part, the second part or both parts.

If whichever integrity checks that are performed (e.g., of the first part and/or the second part) are successfully verified, then the process of starting the secure guest may continue.

In one embodiment, both the first and second parts of the metadata may include information that can restrict the environment (e.g., particular system configurations) in which a secure guest can be started and include certain restrictions on operations (e.g., allowing to dump a secure guest) of the secure guest. The trusted execution environment performs one or more processing restriction checks of at least one part of the metadata 406. Again, the checks for each part may be performed independently, and for instance, the checks using the first part of the metadata are performed prior to starting the secure guest but the checks using the second part of the metadata are performed prior to or subsequent to starting the secure guest. (In another embodiment, the processing restriction checks using both the first part and the second part of the metadata may be performed subsequent to starting the secure guest; other variations may also be possible.) If the processing restrictions (e.g., environmental and/or operational) that are checked are satisfied by the environment of the trusted execution environment, then the process of starting the secure guest may continue. Operations that are not restricted by any of the multiple parts of the secure guest metadata can be performed on the secure guest.

If any of the checks (e.g., the integrity and processing) that were performed are unsuccessful 410, then the secure guest is not started 412 and processing is complete; however, if the checks that were performed are successful, then the secure guest is started 414, by the trusted execution environment, using the secure guest image. For instance, the trusted execution environment transitions the central processing unit into a secure guest execution state and sets a program counter to the secure guest start address, which is, e.g., contained in the first part of the metadata and thus, known by the trusted execution environment.

Figure 4B:
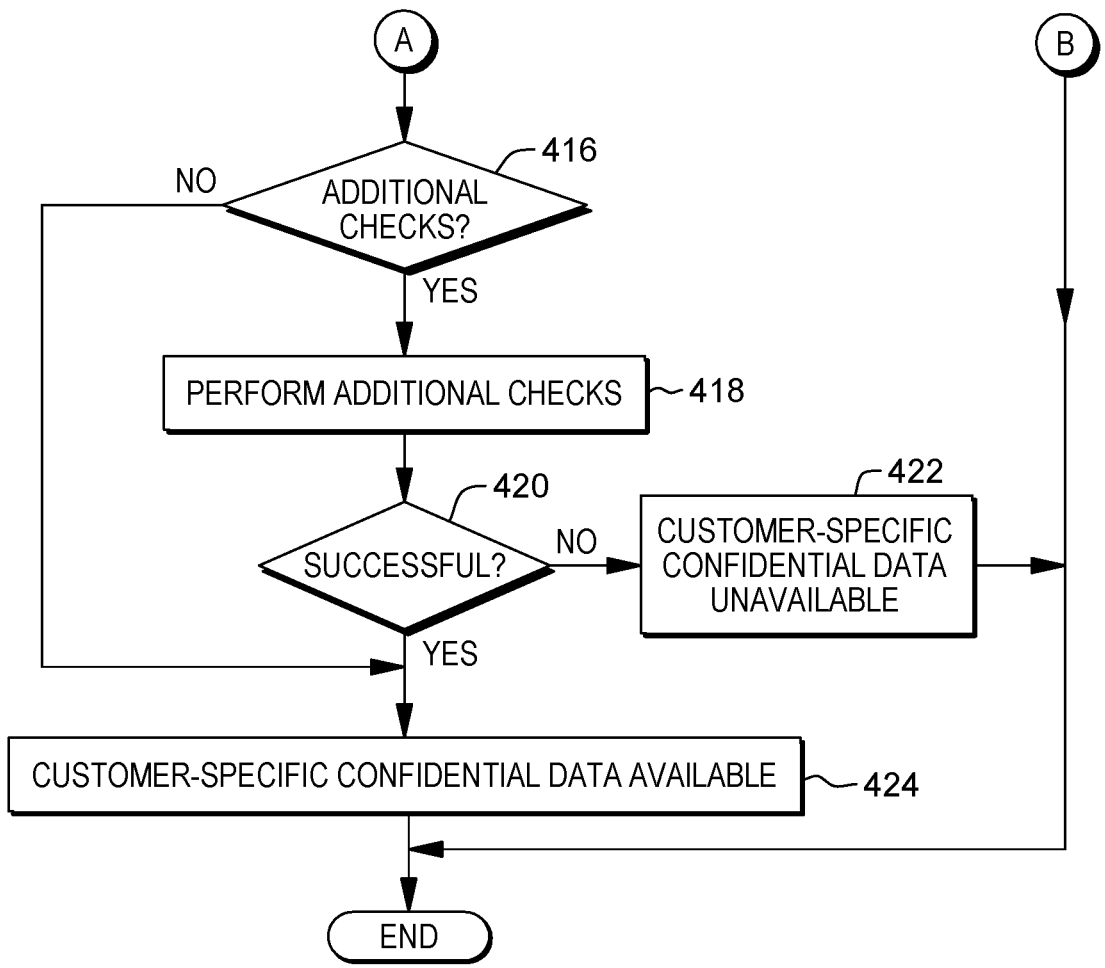

Thereafter, referring to FIG. 4B, a determination is made as to whether there are additional checks to be performed 416. For instance, if the integrity and/or processing restriction checks of the second part of the metadata were not previously performed, then the checks of the second part of the metadata are performed by the trusted execution environment 418. Examples of the checks, which include integrity verification and/or processing restriction checks, are described above. If any of the checks were unsuccessful 420, then the customer-specific confidential data is unavailable 422, and processing is complete. However, if the additional checks are successful or if there are no additional checks (e.g., the checks performed in 404 and 406 included checks for both the first part and the second part of the metadata), then the customer-specific confidential data is made available 424. Processing is complete.

The checks (e.g., integrity and processing restriction checks) are performed by the trusted execution environment based on, for instance, receiving by the trusted execution environment one or more calls (e.g., using one or more trusted execution environment functions) from, e.g., the hypervisor to start a secure guest. In one example, there is a call to submit a secure guest image and part one of the metadata, and another call to submit part two of the metadata. In other examples, there is one call to submit the image and both parts of the metadata; a call for each of the image and each metadata part; a call for the image and a call for both parts of the metadata; or a combination of one or more of the above. Various possibilities exist.

The integrity of each part of the secure guest metadata is checked in which the first part is used to check the integrity of the secure guest image and optionally, decrypt the encrypted data. Further, the trusted execution environment may check whether the integrity data of the secure guest image in the second part matches the secure guest image.

In running the secure guest, the trusted execution environment takes the confidential data and the operational constraints of both parts of the metadata into account. In one example, a trusted execution environment when presented a two-part metadata for a secure guest image will start the secure guest using the confidential data in the second part of the metadata (or a combination of the confidential data of both parts) when, for instance, the integrity of the first part can be verified using the metadata integrity measure(s) of the first part, the secure guest image can be prepared for starting using the data from the first part of the metadata, the integrity of the loaded secure guest can be verified using the integrity measure(s) of the generic secure image from both the first part and second part, and the integrity measure(s) of the first part in the second part can be used to verify the integrity of the first part.

Examples of the customer-specific confidential data stored by users in the second part of the secure guest metadata include: confidential data used to bind certain devices (e.g., hardware security modules) to a secure guest image, confidential data that may be loaded by a secure guest from the trusted execution environment during a self-customization routine within the boot process of the secure guest, and/or keys, passwords, etc. Certain of the confidential data may be used by the secure guest but not provided or disclosed to the secure guest (e.g., confidential data to bind certain devices) and other items of the confidential data may be provided to the secure guest (e.g., keys, passwords, etc.). As used herein, the customer-specific confidential data that may be provided to the secure guest based on a request is referred to as loadable customer-specific confidential data.

In one example, if at least a portion of the customer-specific confidential data from the second part is to be infused into the secure guest, this is to occur during the start of the secure guest (e.g., either prior to the secure guest getting control over the processor or immediately after it gets control, but before the first external communication).

In one embodiment, subsequent to the secure guest being loaded, the secure guest may request, in accordance with one or more aspects of the present invention, its loadable customer-specific confidential data. In one aspect, the loadable customer-specific confidential data is provided to the secure guest absent reloading or changing the secure guest image that has been loaded. Yet further, the trusted execution environment need not know the memory layout of the secure guest in order to place the confidential data in the secure guest. Further, in one embodiment, this confidential data is supplied to the secure guest in such a manner that the secure guest does not know the plain text value of the confidential data. In another embodiment, the confidential data is returned to the secure guest as plain text data.

In accordance with an aspect of the present invention, a selected portion of the metadata of the secure guest (e.g., part two of the secure guest metadata) is extended to contain the customer-specific confidential data. In one example, the metadata (e.g., part two of the secure guest metadata) of the secure guest is extended to contain the customer-specific confidential data together with one or more identifiers of the confidential data. In yet another example, the metadata (e.g., part two of the secure guest metadata) of the secure guest is further extended to include an indicator used to indicate whether the confidential data may be returned as a plain text value to the secure guest. Other possibilities also exist. In one embodiment, the customer-specific confidential data, associated identifier and indicator are included in a data structure used by the trusted execution environment in starting the secure guest.

Further details of starting a secure guest and providing customer-specific confidential data to the secure guest (e.g., subsequent to loading the secure guest image and/or from a source other than an owner of the guest) is described with reference to FIGS. 5A-5D. As shown in a FIG. 5A, a secure guest image 500 and metadata 502 are available for use in loading the image as a secure guest. As an example, metadata 502 includes part one (502a) and part two (502b). Part two metadata 502b includes at least loadable customer-specific confidential data 504, as well as other information, as described above.

In one example, referring to FIG. 5B, hypervisor 510 loads 512 secure guest image 500 into memory of the computing environment to create a secure guest 514. Further, hypervisor 510 loads metadata 502 into a trusted execution environment 520.

Referring to FIG. 5C, trusted execution environment 520 performs, for instance, one or more integrity checks, one or more processing checks, optionally decrypts the secure guest image, and starts secure guest image 522 as secure guest 514, assuming the checks are successful.

Further, in accordance with an aspect of the present invention and referring to FIG. 5D, secure guest 514 requests confidential data 504 stored in metadata 502 (e.g., part 2 metadata 502b) located in trusted execution environment 520. In one example, the request is performed via a call

530 from secure guest 514 to the trusted execution environment. The call is, for instance, non-interceptable in that it is directly targeted to the trusted execution environment, and includes, for instance, an identifier of the requested confidential data. Based on the call, the trusted execution environment, using, e.g., a metadata data structure including entries of (confidential data, identifier and indicator) triples, returns a representation of the confidential data (e.g., associated with the identifier) from the secure guest metadata. In one example, the representation is a non-plain text representation (e.g., encrypted) of the confidential data if the indicator associated with the identifier indicates that the confidential data may not be returned as a plain text value. In another example, it is a plain text representation.

As an example representation, if the confidential data is a cryptographic key, then the representation of that key can be an IBM Z® protected key for the secure guest. That is, the key is wrapped (e.g., encrypted) by a wrapping key specific to the secure guest which is hidden in trusted hardware/firmware. In order to provide a plain text key that is usable by the secure guest, the trusted execution environment is to access the wrapping key of the secure guest and use it to unwrap the plain text key before returning the plain text key.

In one example, the call to the trusted execution environment is restricted to be only callable from execution environments running a secure guest. The trusted execution environment enforces that only customer-specific confidential data from the metadata of the calling secure guest is to be referenced and returned by the trusted execution environment.

As described herein, in one or more aspects, customer-specific confidential data is to become available to a secure guest that is trusted by the owner of the secure guest. Customer-specific confidential data of a secure guest may be set or changed without changing or reloading the image of the secure guest. This helps, for instance, if an image of a secure guest is built by some vendor but the secure guest is to run workloads based on confidential data of some customer. In one aspect, the architected location in memory of the secure guest is not needed to place the confidential data in the memory of the secure guest. The trusted execution environment need not know when and where to place the confidential data in the hosted software (i.e., secure guest). Further, in one aspect, bidirectional communication of the confidential data between the trusted execution environment and owner of the secure guest before starting the guest is not needed. The trusted execution environment can start the secure guest based on an image of the secure guest and metadata of the secure guest without interaction with the image owner.

In one or more aspects, the providing of customer-specific confidential data to one or more secure guests via metadata of the one or more secure guests includes, for instance, securely (e.g., confidentially and integrity protected) communicating metadata of the secure guest to a trusted execution environment. The metadata of the secure guest includes integrity measures of an image of the secure guest to be loaded. The metadata (e.g., part 2 metadata) of the secure guest includes customer-specific confidential data (e.g., optionally with an identifier). The trusted execution environment supports a trusted execution environment function that can be called by the secure guest that returns customer-specific confidential data to the secure guest (e.g., optionally, selected by the identifier). The secure guest can use the confidential data (e.g., setup/open encrypted root volumes, keys, passwords, etc.) to establish a secure communication to an external environment. In one example, the customer-specific confidential data are keys, and the trusted execution environment function returns the keys as protected keys (e.g., keys protected by trusted firmware for which the system provides interfaces to perform cryptographic operations). The function call is, e.g., not interceptable and is directly targeted to the trusted execution environment.

In one or more aspects, customization of secure guest metadata includes use of metadata for a secure guest that is split into multiple parts (e.g., two parts): part one includes, for instance, vendor-specific confidential data and integrity measures (and optional vendor control flags) for a generic secure guest image, and part two includes, for instance, customer-specific confidential data (and optional customer control flags), as well as integrity measures of (optional: the generic secure guest image and) the first part. Both parts are independently integrity protected. A trusted execution environment service is used to start a secure guest using the split metadata. In one example, the service receives and unpacks (e.g., decrypts) a secure guest image based on the first metadata part. Further, in one example, the integrity measure(s) of the first part (optional: and of the generic secure guest image) are checked for a match of the according value(s) stored in the second part. If the (e.g., all) integrity measurements can be verified, the secure guest is started. (In another embodiment, only a portion of the verifications is performed prior to starting the secure guest and another portion is performed, e.g., after starting the secure guest but prior to making the customer-specific confidential data accessible.) If customer-specific confidential data from the second part is to be infused into the secure guest this is to happen during the start of the secure guest (i.e., either before the secure guest gets control (over the CPU) or immediately after it gets control, but before the first external communication). Both the first and the second part of the metadata may include information that can restrict the environment (e.g., particular system configurations) in which a secure guest can be started and certain restrictions on operations (e.g., allowing to dump a secure guest) of the secure guest. If the environmental restrictions are satisfied by the environment of the trusted execution environment, the secure guest can be started. Operations that are not restricted by any of the two parts of secure guest metadata can be performed on the secure guest.

One or more aspects of the present invention are inextricably tied to computer technology and facilitate processing within a computer, improving performance thereof. Processing is facilitated by enabling a secure guest access to customer-specific confidential data (e.g., keys, passwords, etc.) usable in communicating with other entities. Performance is improved by not requiring a reloading or changing of the secure guest image, by not requiring communication with the owner of the guest to provide the confidential data and/or without knowing an exact location (e.g., memory location) for the confidential data to be placed in the secure guest. Further, processing is facilitated by providing multi-part metadata that may be independently and separately used and verified.

Further details of one embodiment of facilitating processing within a computing environment, as it relates to one or more aspects of the present invention, are described with reference to FIGS. 6A-6C.

Referring to FIG. 6A, in one embodiment, a trusted execution environment obtains a secure guest image and metadata to be used to start a secure guest 600. The metadata includes multiple parts and a plurality of integrity measures 602. A first part of the metadata includes one or more integrity measures of the plurality of integrity measures 604, and a second part of the metadata includes customized confidential data of the secure guest and one or more other integrity measures of the plurality of integrity measures 606. The trusted execution environment is used to verify at least one select part of the metadata using at least one integrity measure of the plurality of integrity measures of the metadata 608. Based on successful verification of the at least one select part of the metadata, the trusted execution environment starts the secure guest using the secure guest image and at least a portion of the metadata 610.

The providing of multiple parts of the metadata enables, for instance, vendor-specific and customer-specific confidential data to be maintained separately. It also facilitates processing by enabling each part separately and independently to be used in starting a secure guest and/or enabling access to confidential data.

As an example, the first part of the metadata is integrity protected and includes a first encrypted portion and the second part of the metadata is integrity protected and includes a second encrypted portion 612. The trusted execution environment is exclusively configured to decrypt the first encrypted portion and the second encrypted portion 614. At least one of the first encrypted portion and the second encrypted portion includes select confidential data to be used in processing related to the secure guest 616. By exclusively configuring the trusted execution environment to decrypt the encrypted portions, confidentiality is secured. The encrypted portions may include confidential data useful in, for instance, decrypting an encrypted image, in communication with the owner of the guest, and/or to be used during execution of the secure guest.

In one example, referring to FIG. 6B, the verifying the at least one select part of the metadata includes verifying integrity of the first part of the metadata 620. The verifying integrity of the first part of the metadata includes, for instance, performing at least one integrity measurement of the secure guest image loaded into memory of the secure guest to obtain a result and determining that the result has a predefined relationship with at least one integrity measure of the one or more integrity measures of the first part of the metadata 622. The verifying integrity of the first part also includes, for instance, verifying integrity of select information of the first part of the metadata using at least one integrity measure of the one or more integrity measures of the first part of the metadata 624. By verifying integrity of the first part of the metadata, the secure guest is not improperly started, maintaining protection.

In one example, the verifying the at least one select part of the metadata includes verifying integrity of the second part of the metadata using at least one other integrity measure of the one or more other integrity measures of the second part of the metadata 630. The verifying the integrity of the second part of the metadata includes, for instance, performing at least one integrity measurement of the first part of the metadata to obtain a result and determining that the result has a predefined relationship with at least one other integrity measure of the one or more other integrity measures of the second part of the metadata 632. By having the second part of the metadata contain measurements of the first part of the metadata, the creator of the second part of the metadata is able to restrict that part of the metadata to be combined only with a very specific first part of the metadata. This facilitates the maintaining of confidentiality and security.

In one embodiment, use of the customized confidential data is enabled based at least on verifying the integrity of the second part of the metadata 634.

As an example, referring to FIG. 6C, the starting the secure guest is performed based on successful verification of the first part of the metadata and prior to verification of the second part of the metadata 640. This allows the starting of the secure guest to be performed prior to verification of the second part of the metadata. As another example, the starting the secure guest is performed based on successful verification of the first part of the metadata and the second part of the metadata 642.

In one example, the metadata includes one or more processing restrictions 644. At least one check of at least one processing restriction of the one or more processing restrictions is performed 646. Based at least on the at least one check being successful, the starting the secure guest is performed 648. Since each metadata part is separate, checks from the first part may be performed and then the secure guest may be started. Thereafter, checks from the second part may be performed. In another embodiment, the checks from both parts are performed prior to, for instance, starting the secure guest.

As an example, the first part of the metadata further includes confidential data of a creator of the secure guest 650. Further, in one aspect, based on a request for the customized confidential data, the customized confidential data stored in the second part of the metadata is provided from the trusted execution environment to the secure guest 652.

Other variations and embodiments are possible.

Figure 7A:
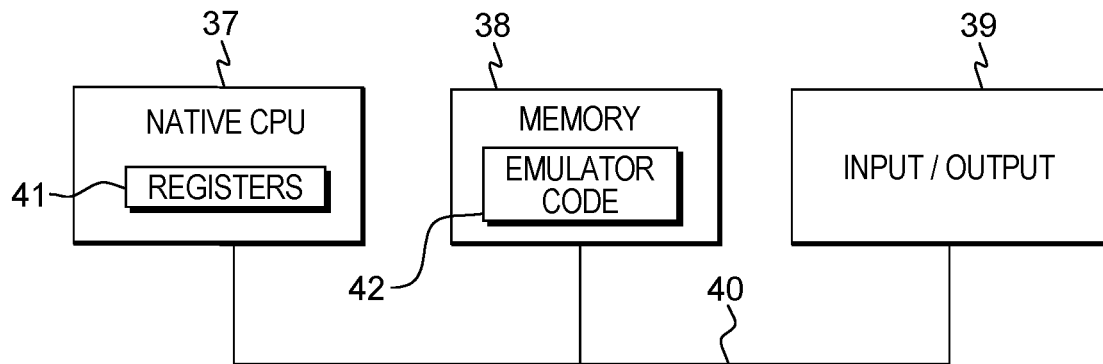
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 7B:
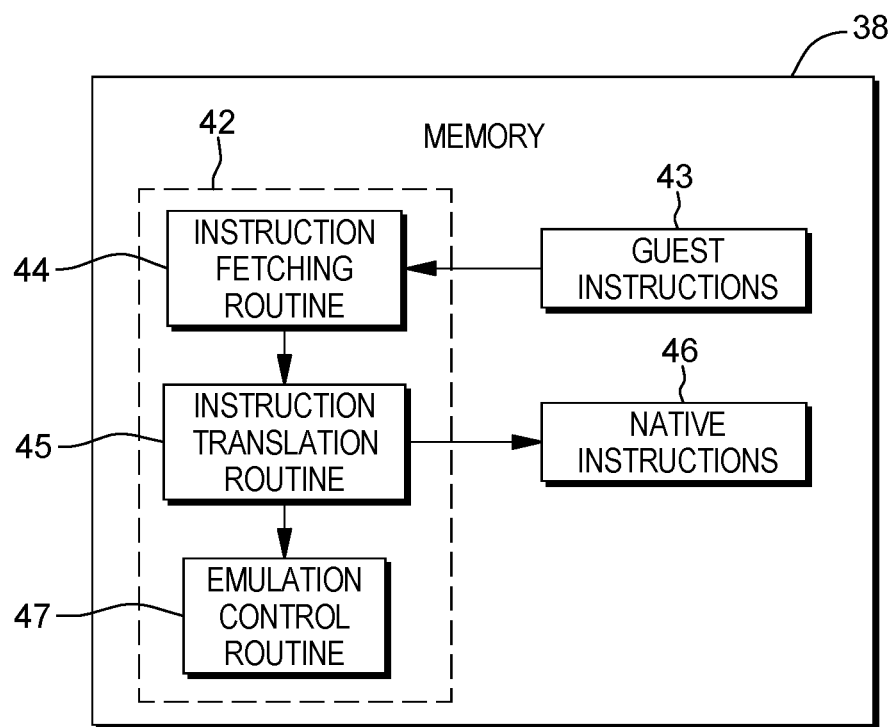
FIG. 7B depicts further details of the memory of FIG. 7A, in accordance with one or more aspects of the present invention.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes one or more trusted execution environment calls described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
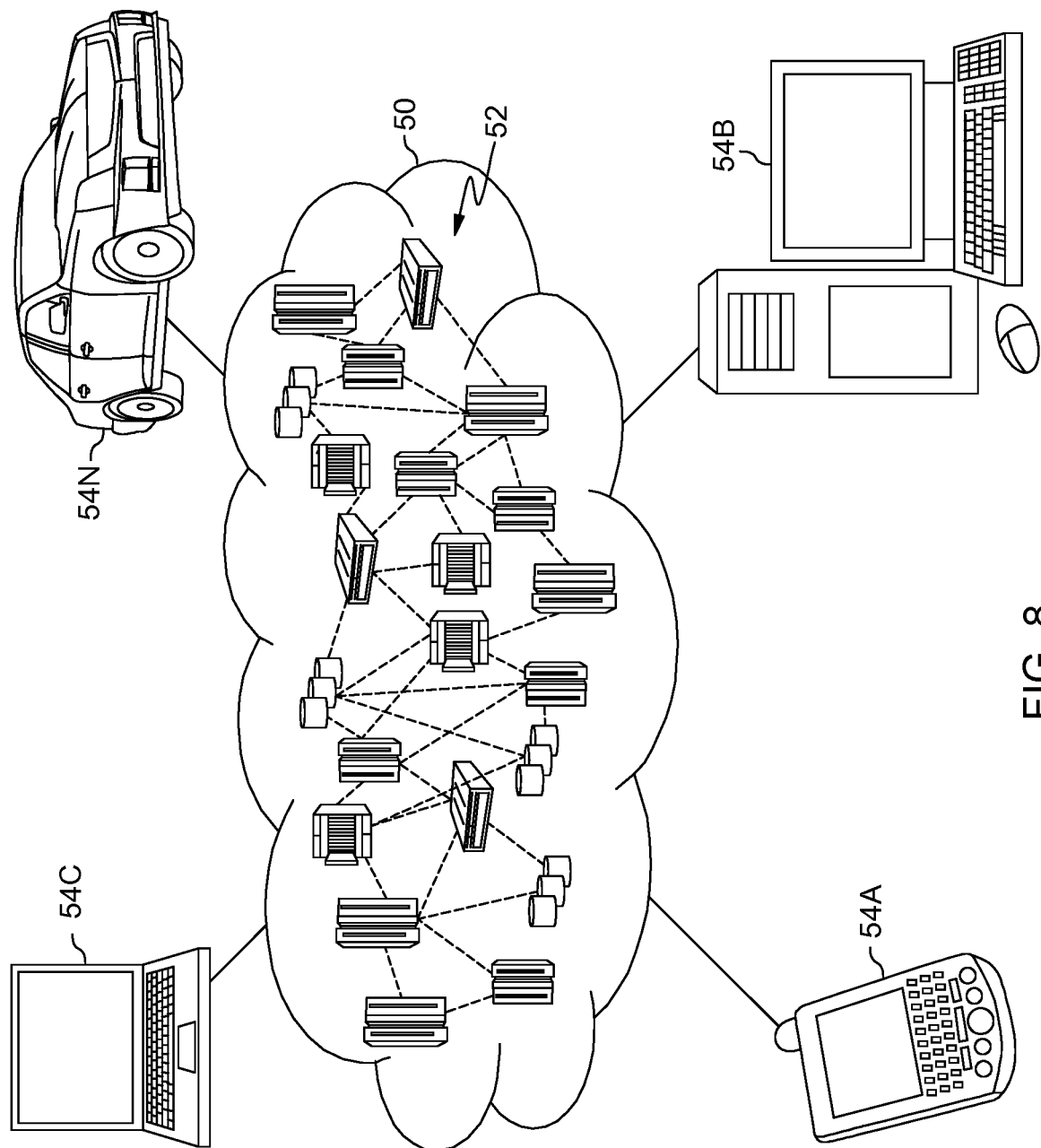
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
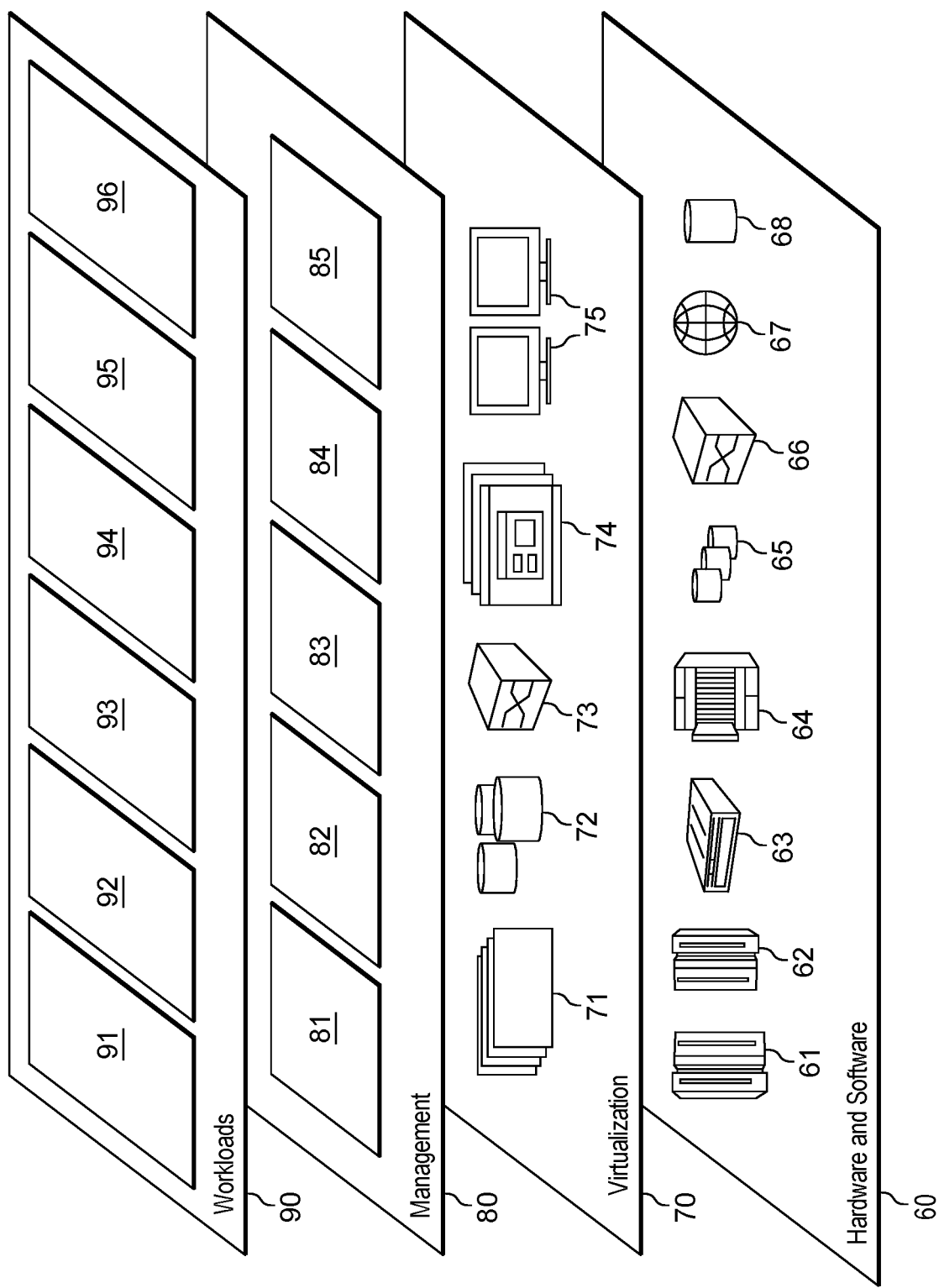
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and provision of confidential data processing using multi-part metadata 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different types of structures may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer readable storage media and program instructions collectively stored on the one or more computer readable storage media to perform a method comprising:
obtaining, by a trusted execution environment, a secure guest image and metadata to be used to start a secure guest, the metadata including multiple parts and a plurality of integrity measures, wherein a first part of the metadata includes particular information and one or more integrity measures of the plurality of integrity measures, and a second part of the metadata includes customized confidential data of the secure guest and one or more other integrity measures of the plurality of integrity measures, the particular information being different from the customized confident data of the secure guest;
verifying, using the trusted execution environment, at least one select part of the metadata using at least one integrity measure of the plurality of integrity measures of the metadata; and
starting, by the trusted execution environment, the secure guest using the secure guest image and at least a portion of the metadata, based on successful verification of the at least one select part of the metadata.

2. The computer program product of claim 1, wherein the first part of the metadata is integrity protected and includes a first encrypted portion and the second part of the metadata is integrity protected and includes a second encrypted portion, and wherein the trusted execution environment is exclusively configured to decrypt the first encrypted portion and the second encrypted portion, at least one of the first encrypted portion and the second encrypted portion including select confidential data to be used in processing related to the secure guest.

3. The computer program product of claim 1, wherein the verifying the at least one select part of the metadata includes verifying integrity of the first part of the metadata, wherein the verifying integrity of the first part of the metadata includes:
performing at least one integrity measurement of the secure guest image loaded into memory of the secure guest to obtain a result and determining that the result has a predefined relationship with at least one integrity measure of the one or more integrity measures of the first part of the metadata; and
verifying integrity of select information of the first part of the metadata using at least one integrity measure of the one or more integrity measures of the first part of the metadata.

4. The computer program product of claim 1, wherein the verifying the at least one select part of the metadata comprises verifying integrity of the second part of the metadata using at least one other integrity measure of the one or more other integrity measures of the second part of the metadata.

5. The computer program product of claim 4, wherein the verifying the integrity of the second part of the metadata includes performing at least one integrity measurement of the first part of the metadata to obtain a result and determining that the result has a predefined relationship with at least one other integrity measure of the one or more other integrity measures of the second part of the metadata.

6. The computer program product of claim 5, wherein the method further comprises enabling use of the customized confidential data based at least on verifying the integrity of the second part of the metadata.

7. The computer program product of claim 1, wherein the starting the secure guest is performed based on successful verification of the first part of the metadata and prior to verification of the second part of the metadata.

8. The computer program product of claim 1, wherein the starting the secure guest is performed based on successful verification of the first part of the metadata and the second part of the metadata.

9. The computer program product of claim 1, wherein the metadata includes one or more processing restrictions, and the method further comprises performing at least one check of at least one processing restriction of the one or more processing restrictions, wherein the starting the secure guest is performed based at least on the at least one check being successful.

10. The computer program product of claim 1, wherein the particular information includes confidential data of a creator of the secure guest, and wherein the method further comprises providing from the trusted execution environment to the secure guest the customized confidential data stored in the second part of the metadata based on a request for the customized confidential data.

11. The computer program product of claim 1, wherein the customized confidential data includes customer-specific confidential data.

12. The computer program product of claim 1, wherein the particular information includes vendor-specific data of a vendor of the secure guest image.

13. A computer system for facilitating processing within a computing environment, the computer system comprising:
  a memory; and
  at least one processor in communication with the memory, wherein the computer system is configured to perform a method, said method comprising:
    obtaining, by a trusted execution environment, a secure guest image and metadata to be used to start a secure guest, the metadata including multiple parts and a plurality of integrity measures, wherein a first part of the metadata includes particular information and one or more integrity measures of the plurality of integrity measures, and a second part of the metadata includes customized confidential data of the secure guest and one or more other integrity measures of the plurality of integrity measures, the particular information being different from the customized confidential data of the secure guest;
    verifying, using the trusted execution environment, at least one select part of the metadata using at least one integrity measure of the plurality of integrity measures of the metadata; and
    starting, by the trusted execution environment, the secure guest using the secure guest image and at least a portion of the metadata, based on successful verification of the at least one select part of the metadata.

14. The computer system of claim 13, wherein the first part of the metadata is integrity protected and includes a first encrypted portion and the second part of the metadata is integrity protected and includes a second encrypted portion, and wherein the trusted execution environment is exclusively configured to decrypt the first encrypted portion and the second encrypted portion, at least one of the first encrypted portion and the second encrypted portion including select confidential data to be used in processing related to the secure guest.

15. The computer system of claim 13, wherein the verifying the at least one select part of the metadata includes verifying integrity of the first part of the metadata, wherein the verifying integrity of the first part of the metadata includes:
  performing at least one integrity measurement of the secure guest image loaded into memory of the secure guest to obtain a result and determining that the result has a predefined relationship with at least one integrity measure of the one or more integrity measures of the first part of the metadata; and
  verifying integrity of select information of the first part of the metadata using at least one integrity measure of the one or more integrity measures of the first part of the metadata.

16. The computer system of claim 13, wherein the verifying the at least one select part of the metadata comprises verifying integrity of the second part of the metadata using at least one other integrity measure of the one or more other integrity measures of the second part of the metadata.

17. The computer system of claim 16, wherein the verifying the integrity of the second part of the metadata includes performing at least one integrity measurement of the first part of the metadata to obtain a result and determining that the result has a predefined relationship with at least one other integrity measure of the one or more other integrity measures of the second part of the metadata; and
  wherein the method further comprises enabling use of the customized confidential data based at least on verifying the integrity of the second part of the metadata.

18. The computer system of claim 13, wherein the customized confidential data includes customer-specific confidential data.

19. A computer-implemented method of facilitating processing within a computing environment, the computer-implemented method comprising:
  obtaining, by a trusted execution environment, a secure guest image and metadata to be used to start a secure guest, the metadata including multiple parts and a plurality of integrity measures, wherein a first part of the metadata includes particular information and one or more integrity measures of the plurality of integrity measures, and a second part of the metadata includes customized confidential data of the secure guest and one or more other integrity measures of the plurality of integrity measures, the particular information being different from the customized confidential data of the secure guest;
  verifying, using the trusted execution environment, at least one select part of the metadata using at least one integrity measure of the plurality of integrity measures of the metadata; and
  starting, by the trusted execution environment, the secure guest using the secure guest image and at least a portion of the metadata, based on successful verification of the at least one select part of the metadata.

20. The computer-implemented method of claim 19, wherein the first part of the metadata is integrity protected and includes a first encrypted portion and the second part of the metadata is integrity protected and includes a second encrypted portion, and wherein the trusted execution environment is exclusively configured to decrypt the first encrypted portion and the second encrypted portion, at least one of the first encrypted portion and the second encrypted portion including select confidential data to be used in processing related to the secure guest.

21. The computer-implemented method of claim 19, wherein the verifying the at least one select part of the metadata includes verifying integrity of the first part of the metadata, wherein the verifying integrity of the first part of the metadata includes:
  performing at least one integrity measurement of the secure guest image loaded into memory of the secure guest to obtain a result and determining that the result has a predefined relationship with at least one integrity measure of the one or more integrity measures of the first part of the metadata; and
  verifying integrity of select information of the first part of the metadata using at least one integrity measure of the one or more integrity measures of the first part of the metadata.

22. The computer-implemented method of claim 19, wherein the verifying the at least one select part of the metadata comprises verifying integrity of the second part of the metadata using at least one other integrity measure of the one or more other integrity measures of the second part of the metadata.

23. The computer-implemented method of claim 22, wherein the verifying the integrity of the second part of the metadata includes performing at least one integrity measurement of the first part of the metadata to obtain a result and determining that the result has a predefined relationship with at least one other integrity measure of the one or more other integrity measures of the second part of the metadata; and wherein the method further comprises enabling use of the customized confidential data based at least on verifying the integrity of the second part of the metadata.

24. The computer-implemented method of claim 19, wherein the customized confidential data includes customer-specific confidential data.

25. The computer-implemented method of claim 19, wherein the particular information includes vendor-specific data of a vendor of the secure guest image.

\* \* \* \* \*